US007963684B2

(12) United States Patent
Staub et al.

(10) Patent No.: US 7,963,684 B2
(45) Date of Patent: Jun. 21, 2011

(54) SEMICONDUCTOR PROJECTION MODULE HAVING TWO-PART REFLECTOR FOR AN AUTOMOBILE HEADLAMP

(75) Inventors: Benjamin Staub, Reutlingen (DE); Matthias Brendle, Tuebingen (DE)

(73) Assignee: Automotive Lighting Reutlingen GmbH (DE)

( * ) Notice: Subject to any disclaimer, the term of this patent is extended or adjusted under 35 U.S.C. 154(b) by 73 days.

(21) Appl. No.: 12/200,047

(22) Filed: Aug. 28, 2008

(65) Prior Publication Data

US 2009/0097269 A1 Apr. 16, 2009

(30) Foreign Application Priority Data

Oct. 15, 2007 (DE) ......................... 10 2007 049 309

(51) Int. Cl.
*B60Q 1/04* (2006.01)

(52) U.S. Cl. ........ 362/539; 362/518; 362/519; 362/545; 362/507

(58) Field of Classification Search .................. 362/507, 362/538, 539, 545, 512, 514, 517, 518, 519
See application file for complete search history.

(56) References Cited

U.S. PATENT DOCUMENTS 1,397,793 A * 11/1921 Blackett ........................ 362/517
1,702,746 A * 2/1929 Prichard ....................... 362/518
1,946,379 A * 2/1934 Ziesing ......................... 362/516
4,772,987 A * 9/1988 Kretschmer et al. .......... 362/539
4,914,747 A * 4/1990 Nino ............................. 362/539
5,213,406 A * 5/1993 Neumann et al. ............. 362/512
5,264,993 A * 11/1993 Neumann et al. ............. 362/514
6,059,435 A * 5/2000 Hamm et al. ................. 362/514
6,575,608 B2 * 6/2003 Oyama et al. ................. 362/517
7,207,705 B2 * 4/2007 Ishida ........................... 362/517
2005/0094402 A1 * 5/2005 Albou ........................... 362/517
2005/0117363 A1 * 6/2005 Yamamura et al. ........... 362/518
2006/0171160 A1 * 8/2006 Meyrenaud et al. .......... 362/517

FOREIGN PATENT DOCUMENTS

DE 19832466 A1 2/2000
DE 10342635 A1 4/2005
DE 102005041065 A1 8/2006
EP 1357332 A2 10/2003
EP 1526328 A2 4/2005
EP 1705422 A1 9/2006

* cited by examiner

*Primary Examiner* — Ismael Negron
(74) *Attorney, Agent, or Firm* — Donald R. Boys; Central Coast Patent Agency, Inc.

(57) ABSTRACT

A projection module for an automobile headlamp includes at least one semiconductor emission source which emits electromagnetic radiation, a reflector reflecting the emitted irradiation, a baffle arrangement shading at least a portion of the reflected irradiation, and a projection lens for projecting the reflected irradiation. The irradiation passes by the baffle arrangement to create a desired emission distribution from the projection module in front of the automobile. At least one emission source is mounted on, or near, the rear side of the baffle arrangement, and a main irradiation direction of the minimum of one emission source is directed into the semi-open space opposite the irradiation-output direction from the projection module.

9 Claims, 5 Drawing Sheets

Figure 1:
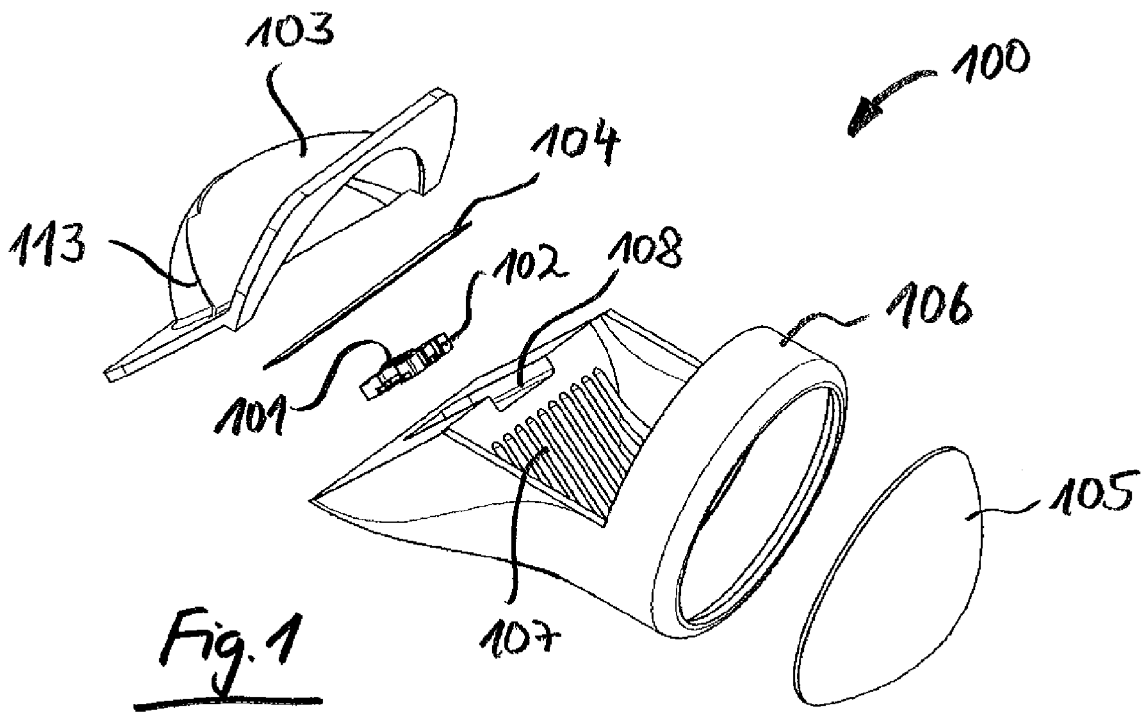

SEMICONDUCTOR PROJECTION MODULE HAVING TWO-PART REFLECTOR FOR AN AUTOMOBILE HEADLAMP

CROSS-REFERENCE TO RELATED DOCUMENTS

The present application claims priority to a German patent application serial number DE 10 2007 049 309.8, which was filed on Oct. 15, 2007, which is incorporated herein in its entirety, at least by reference.

The invention relates to a projection module for an automobile headlamp. The module includes at least one semiconductor emission source to emit electromagnetic radiation, a reflector to reflect the emitted irradiation, a baffle arrangement to shade at least a portion of the reflected irradiation, and a projection lens to project the reflected irradiation and the irradiation passing by the baffle arrangement to create a desired emission distribution from the projection module in front of the automobile.

Projection modules with one or more LED's (Light Emitting Diodes) as the emission source are known to the State of the Art in various application forms. Depending on the wavelength of the irradiation emitted by the LED's, the projection module may be used to emit visible light, invisible ultraviolet, (UV) or infrared (IR) irradiation. The invisible irradiation serves, for example, to illuminate the roadway in front of an automobile within the scope of a night-vision device (e.g., "Night vision" for Mercedes-Benz or BMW automobiles). The area illuminated using invisible irradiation may be recorded using a UV- or IR-sensitive camera and presented to the driver, e.g., on a screen in the dashboard or by means of projection onto the inner surface of the windshield.

In LED projection modules known to the State of the Art, the LED's and the baffle arrangement are positioned to be spatially separated. This distance between the LED's and the baffle arrangement, and the distance from the baffle arrangement to the projection lens, strongly dictate the minimum design length of the projection system.

Because of the increasing complexity of automobile headlamps, additional illumination functions (e.g., city lights, countryside lights, high-speed highway lights, poor-weather lights, etc.), however, future projection modules that must be integrated into the headlamp and accommodate new design aspects must be as compact and small-dimensioned as possible. There is also the option in LED light modules for automobile headlamp of integrating several LED's or LED arrays or differing system types (projection and reflection) into an illumination module. This, however, requires that a compact and small-dimensioned illumination module be used.

Starting from the State of the Art described, it is the task of the invention to design and expand a projection module for an automobile headlamp of the type mentioned at the outset that is as compact and small-dimensioned as possible.

As a solution to this task, it is proposed, starting with an automobile headlamp of the type mentioned at the outset, that the emission source be mounted on or near the rear side of the baffle arrangement, and that the main irradiation direction of the emission source be directed into the semi-open space against the emission output from the projection module.

By positioning the minimum of one LED on or onto the rear side, of the baffle arrangement, the distance between the LED's and the baffle arrangement is reduced to a minimum. This allows the installation length of the projection module to be significantly reduced so that the installation depth of an automobile headlamp including the projection module based on the invention may be reduced, or the installation space made available within the headlamp housing may be used otherwise, for example for electronic control or regulation circuits, or for additional illumination modules.

The LED projection module includes a baffle arrangement to shade a portion of the irradiation reflected from the reflector. Thus, the module is suited to the creation of a light-distribution scheme with a light-dark limiting line, for example a dimmed-headlamp distribution, fog-lamp distribution, or even an adaptive light-distribution scheme including, for example, city lights, countryside lights, high-speed highway lights, poor-weather lights, etc. The baffle arrangement may be moveable, and particularly may be designed to be foldable about a horizontal axis extending crosswise to the optical axis so that it may be moved into or out of the irradiation path. Thus, the projection module may be switched between high-beam and a light-distribution scheme with a light-dark limiting line. To create an adaptive light-distribution pattern, the baffle arrangement may include several baffle elements that are moveable with respect to one another, particularly pivotable about a horizontal axis extending parallel to the optical axis. The progression of the light-dark limiting line of the light-distribution pattern is determined by optically-active the upper edges of the upper baffle elements.

Per the invention, the LED's are mounted in a plane that essentially corresponds to the extension plane of the baffle arrangement positioned within the beam path. Also, the LED's are directed rearward, i.e., against the direction of vehicle travel, or against the direction of irradiation output. The extension plane of the baffle arrangement preferably extends obliquely, or about a horizontal axis extending essentially crosswise to the optical axis, so that the main irradiation direction of the LED's positioned in the extension plane is not parallel to the optical axis, but rather slightly upward relative to the optical axis.

The minimum of one emission source is thermally connected to a heat sink. Heat transferred from the emission source to the heat sink may be transferred away from the heat sink by means of air or cooling fluid. The size of the projection module based on the invention may also be further reduced in that the heat sink be an integral component of the baffle arrangement. Alternatively or additionally, the heat sink may also be an integral component of a lens bracket that attaches the projection lens to the reflector. It is particularly advantageous if the heat sink is so configured that it replaces a securing frame of the projection module that holds the reflector, the baffle arrangement, and the projection lens in a definite relationship relative to one another. Based on the invention, the light source with bracket and heat sink is mounted in the space between the baffle arrangement or the extension plane of the baffle arrangement and the projection lens.

Figure 2:
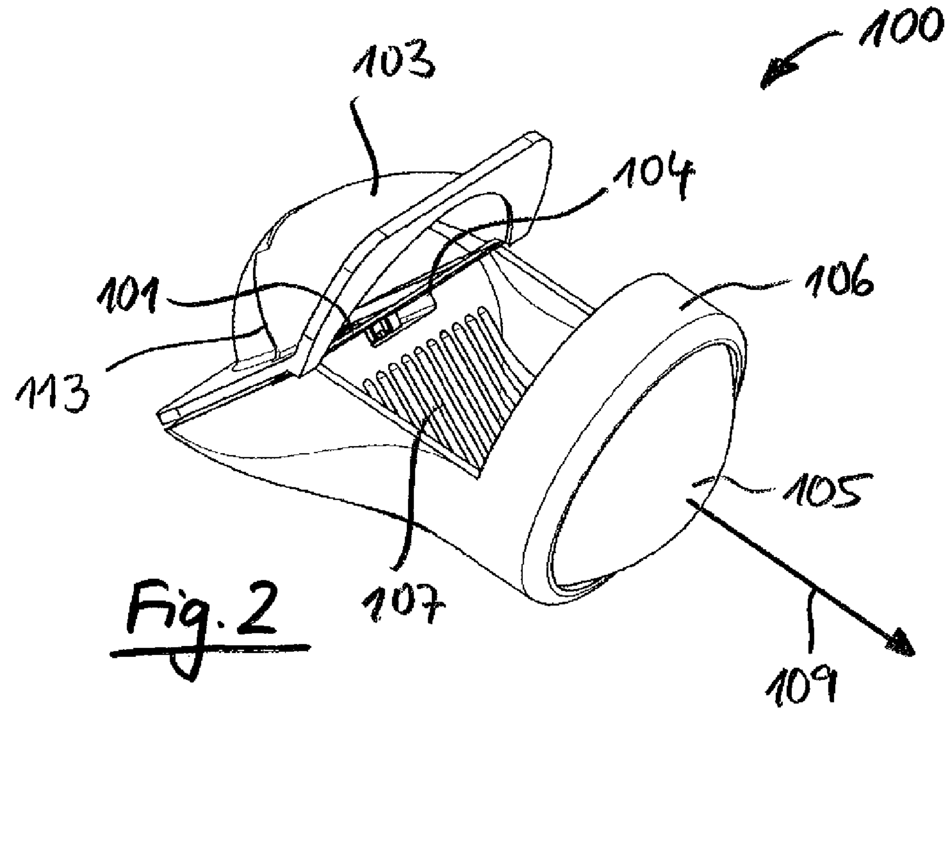
Figure 3:
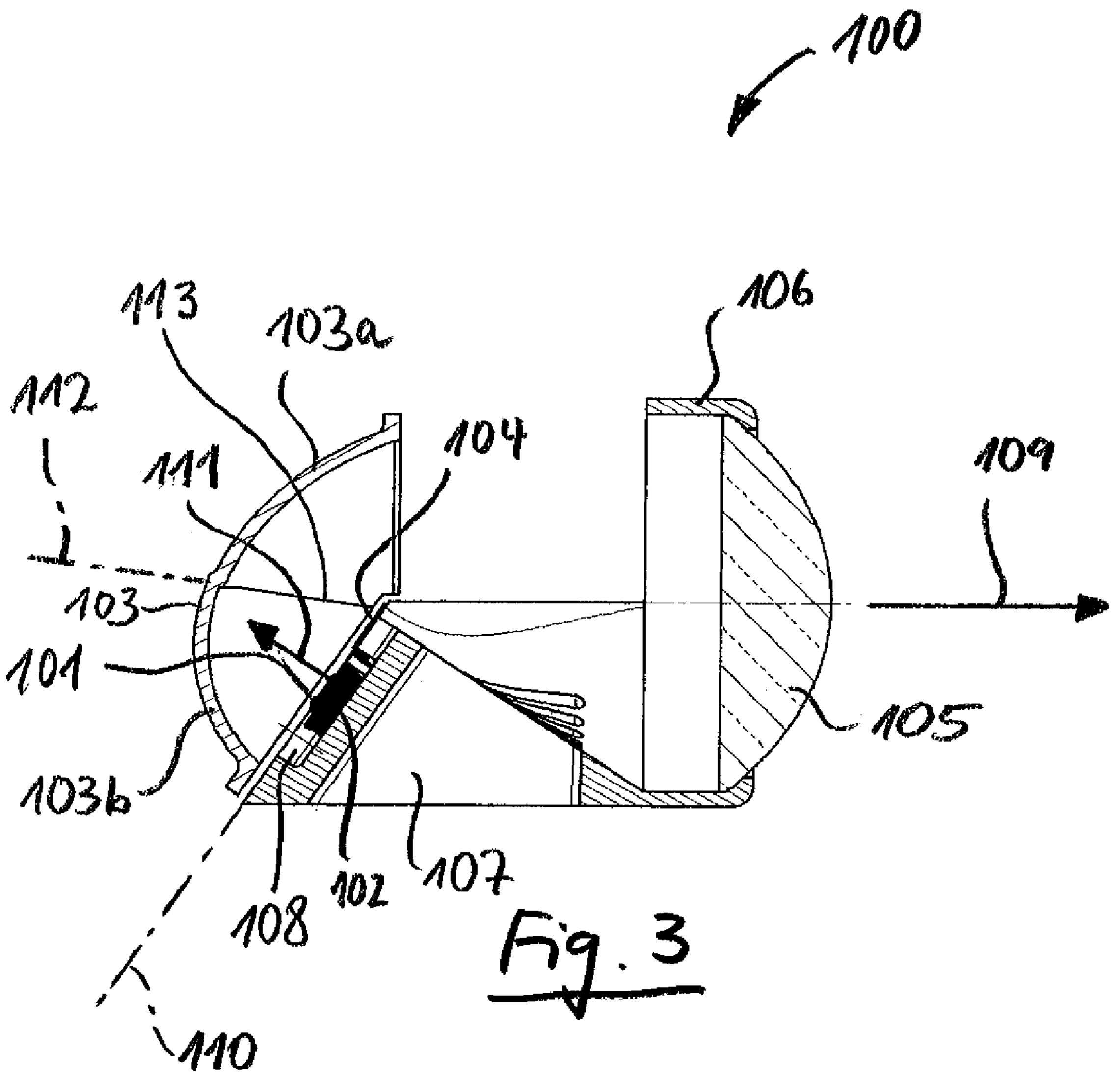
Figure 5:
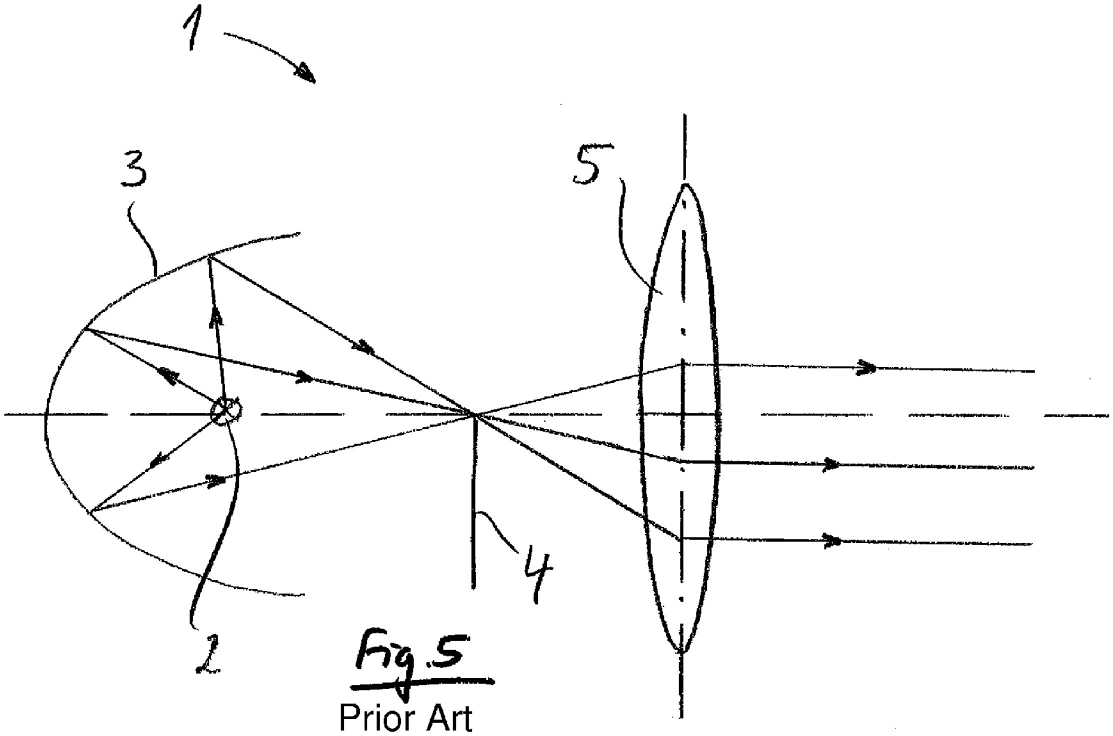
Fig.5 Prior Art

In the following, an advantageous embodiment of the invention will be described in greater detail using Figures, which show:

FIG. 1 exploded view of a projection module based on the invention;

FIG. 2 assembled view of a projection module in FIG. 1 based on the invention;

FIG. 3 longitudinal cutaway view of a projection module in FIG. 1 based on the invention;

FIGS. 4*a*-4*d* various examples for potential configurations of the reflector of the projection module based on the invention with corresponding beam paths;

FIG. 5 projection module known from the State of the Art; and

Figure 6:
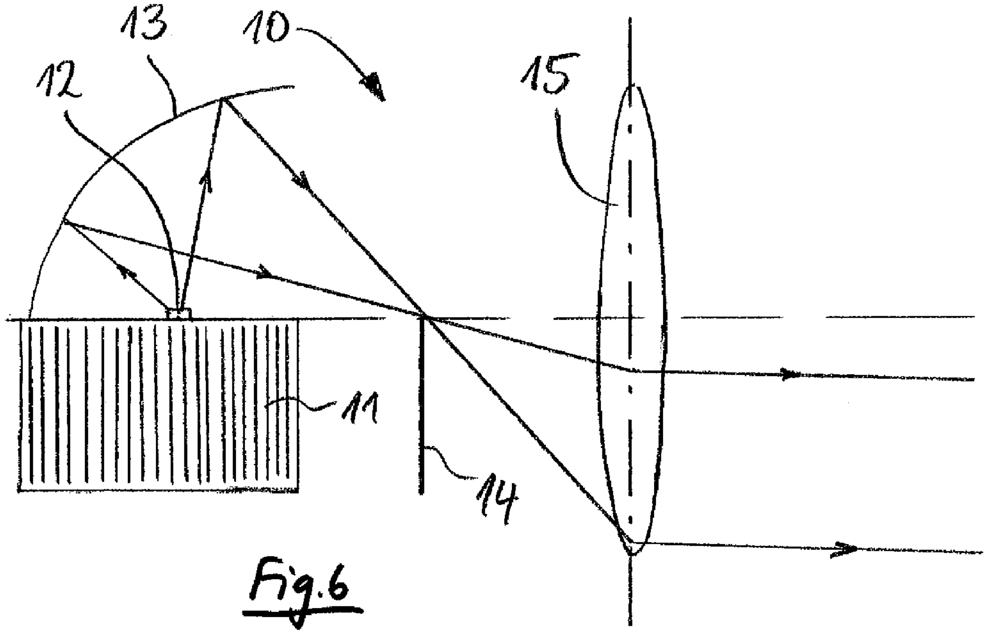
Fig.6 Prior Art

FIG. 6 LED projection module known from the State of the Art.

FIG. 5 shows an LED projection module known from the State of the Art, for example for use in an automobile headlamp as a total unit, designated with reference index 1.

The projection module includes at least one light source 2, which in the State of the Art may be in the form of a conventional incandescent bulb, gas filled light or in the form of one or more semiconductor light sources, so-called LED's. The light source 2 emits electromagnetic irradiation whose wavelength lies within the spectra of visible light, or invisible UV or IR light (relevant wavelengths of about 320-380 nm for UV; 380-700 nm for visible light, and about 700 nm-1,600 nm for IR irradiation).

FIG. 5 shows examples of various beam paths. The light emitted from the light source 2 is reflected by a reflector 3. The reflector 3, for example, may be preferably ellipsoidal or approximately ellipsoidal. The light source 2 is in, or near, a first focal point of the reflector 3. An upper edge of a baffle arrangement 4 is positioned at a second focal point of the reflector 3. The baffle arrangement 4 may include several baffle elements that are displaceable with respect to one another in order to vary the optically-effective upper edge of the baffle arrangement 4. The optically-effective upper edge of the baffle arrangement 4 is projected as a light-dark line onto the roadway in front of the automobile via a projection lens 5 of the module 1. By displacing the baffle arrangement 4 from the second focal point parallel to the optical axis, formation of the light-dark line onto the roadway may be blurred. By variation of the position and/or of the progression of the optically-effective upper edge of the baffle arrangement 4, the position or progression of the light-dark line of the light-distribution pattern may be varied.

FIG. 6 also shows an entire LED projection module known from the State of the Art, labeled with reference index 10. In contrast to the conventional projection module 1 from FIG. 5, the light source 12 in the LED projection module 10 may be formed of one or more LED's that may also be combined into one or more LED arrays. The LED's of light source 12 are thermally connected to a heat sink 1 so that heat arising during operation of the LED's may be diverted by the heat sink 11 to the ambient environment. A reflector 13 is formed as a so-called half-shell reflector that is attached to the heat sink 11. The shape of the reflector 13 may be ellipsoidal, or a free shape deviating therefrom. FIG. 6 also shows examples of several beam paths. As with the known LED projection module 10, the LED's 12 emit electromagnetic irradiation, preferably visible light beams or invisible IR beams. These are reflected by the reflector 13. A baffle arrangement 14 shades a portion of the reflected light beams. The light beams reflected, and those passing through the baffle arrangement 14, are projected by a projection lens 15 to the front of the automobile.

In the known projection modules 1, 10, the minimal installation length is determined by the distance between the light source 2, 12 and the baffle arrangement 4, 14, and by the distance from the baffle arrangement 4, 14 to the projection lens 5, 15. The distance between the light source 2, 12 and the baffle arrangement 4, 14 is relatively large in the known projection modules 1, 10. This is why the installation length of conventional projection modules 1, 10 is relatively large.

Based on the invention, on the other hand, a particularly compact and small-dimensioned LED projection module is proposed that is designated in its entirety by reference index 100. FIGS. 1 through 3 show an advantageous embodiment of the projection module 100 based on the invention. Of course, alternative embodiments are conceivable.

FIG. 1 shows an exploded view of the projection module 100 based on the invention that is mounted and electrically connected via a carrier element 102. It includes one or more LED's 101 electrically connected and mounted on a carrier element 102. The LED's 101 may be combined into one or more LED arrays. Moreover, the projection module 100 includes a reflector 103 and a baffle arrangement 104, which in this embodiment example includes merely a single baffle element with an optically-active upper edge. Of course, the baffle arrangement 104 may include several baffles that may be pivoted with respect to one another in order to vary the position and/or the progression of the light-dark limit line of the light-distribution pattern, preferably about an axis essentially horizontal and parallel to the optical axis. A lens 105 of the projection module is secured within a lens bracket 106. A heat sink to dissipate the heat generated by the LED's 101 during operation is designated with reference index 107. The lens bracket 106 and the heat sink 107 are combined into a single unit.

FIG. 2 shows the LED projection module 100 based on the invention from FIG. 1 in assembled condition. The carrier element 102 is secured along with the LED's 101 in a recess 108 on an oblique rear side of the heat sink 107 so that the LED's 101 are practically flush with the oblique rear side of the heat sink 107. The baffle arrangement 104 is also attached above the LED's 101 on the oblique rear side of the heat sink 107. The baffle arrangement 104 is also practically flush with the oblique rear side of the heat sink 107. Thus, the LED's 101 and the baffle arrangement 104 are mounted practically coplanar. It is easy to recognize the fact that the LED's 101 are mounted on the rear side, or near the rear side, of the baffle arrangement 104. The main projection direction (see arrow 111 in FIG. 3) of the LED's 101 is directed within the semi-open space against the irradiation output direction 109 from the projection module 100. The reflector 103 is also mounted on the oblique rear side of the heat sink 107. The lens 105 is attached to the lens bracket 106, which may be an integral component of the heat sink 107. Thus, in addition to its heat-dissipation function, the heat sink 107 may also serve as a securing frame for the projection module 100 that holds together the LED's 101, the reflector 103, the baffle arrangement 104, and the projection lens 105 in a pre-defined relationship to one another, thus providing an easy-to-handle unit. Overall, the projection module 100 based on the invention is particularly compact and small-dimensioned, as FIG. 2 directly shows.

Based on the cutaway view of the projection module 100 based on the invention in FIG. 3, the assembled condition of the module is again explained. One may recognize particularly well here the fact that the LED's 101 and the baffle arrangement 104 lie within a plane designated with reference index 110 that extends into the plane of the Figure and essentially extends parallel to the oblique rear side of the heat sink 107. The LED's 101 are thus positioned on, or near, the rear side of the baffle arrangement 104. Further, FIG. 3 clearly shows that the main irradiation direction 111 of the LED's 101 is in the semi-open space pointed opposite the light-output direction 109. Along with corresponding configuration of the reflector optics, this allows installation length of the projection module 100 to be considerably reduced in comparison to conventional projection modules 1, 10, since the LED's 101 with their bracket and heat sink 107 are essentially mounted between the baffle arrangement 104 and the projection lens 105, or between the plane 110 and the projection lens 105.

Figure 4A:
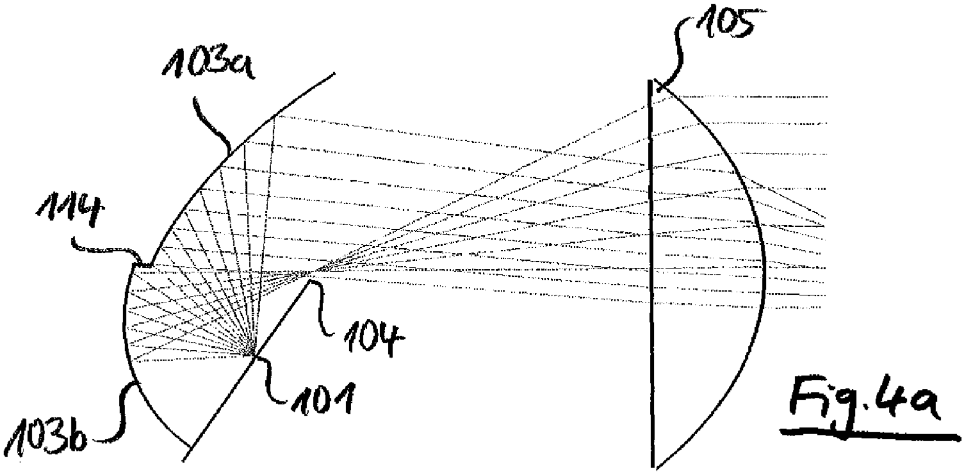
Figure 4B:
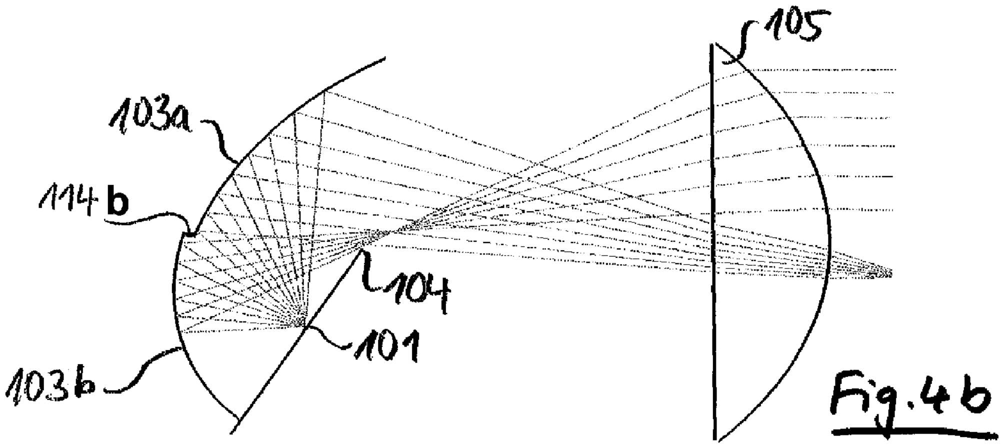
Figure 4C:
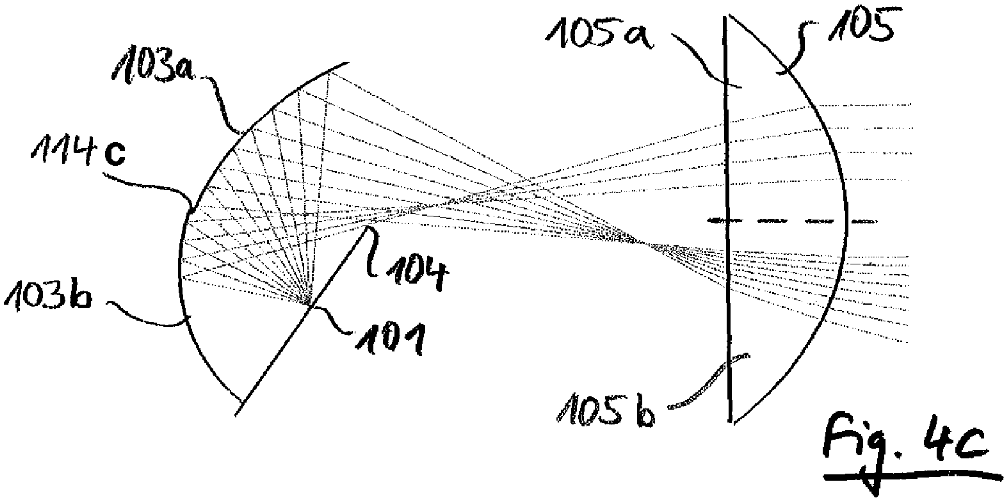

As FIG. 3 shows and FIGS. 4*a* through 4*c* emphasize, the reflector 103 is sub-divided into an upper partial reflector

103*a* and a lower partial reflector 103*b* by a plane that is practically horizontal and that extends into the plane of the Figure. In the illustrated embodiment example, the dividing line between upper and lower reflectors 103*a*, 103*b* is visible and is designated with the reference index 113. The partial reflectors 103*a*, 103*b* are preferably formed as open-shape reflectors. This means that the reflecting surface was calculated at discrete points such that the projection module creates a pre-determined light distribution pattern with pre-determined illumination-strength maxima and predetermined illumination-strength minima. The reflective surface between the discrete points is then interpolated. An open-shape of reflector 103 thus formed is then in the position to create a desired light-distribution pattern without additional optically-acting elements (e.g., prisms or lenses in the front glass of the headlamp).

For simplification, the upper reflector half 103*a* may be observed as an approximate paraboloid, and the lower reflector half 103*b* may be observed as and ellipsoid. For this, the ellipsoid component of the lower reflector half 103*b* is configured such that a focal point lies in, or near, the LED's 101, and the other focal point lies in or near the plane 110 of the baffle arrangement 104. This allows the generation of a strong illumination-strength maximum in the resulting light-distribution pattern. The paraboloid component of the upper reflector half 103*a* is preferably so configured that the focal point of the paraboloid lies in or near the LED's 101. A light-distribution pattern may thus be generated using a basic illumination scheme that is important for illumination of the foreground and for lateral light scattering. FIG. 4*a* shows the resulting beam path of a projection module 100 thus configured, for example. One may clearly recognize a relatively great step 114 between the upper and the lower partial reflectors 103*a*, 13*b*.

FIGS. 4*b* and 4*c* show slightly-altered beam paths in which the position of the focal points of the reflector parts 103*a* and 103*b* have been varied. These variations also lead to good light-distribution patterns meeting legal requirements. In the embodiment example in FIG. 4*b*, the step 114*b* is smaller than that in FIG. 4*a*, and in the embodiment example in FIG. 4*c*, the step 114*c* is clearly even smaller than those from FIGS. 4*a* and 4*b*.

In the embodiment example in FIG. 4*c*, the projection lens 105 is penetrated in clearly-separated areas. For this, the upper reflector half 103*a* supplies the lower lens part 105*b*, and the lower reflector half 103*b* supplies the upper lens part 105*a*. This allows the separated, penetrated areas 105*a*, 105*b* of the lens 105 to be separated from each other, and the individual lens segments 105*a*, 105*b* to be optimized separately from each other, in order to obtain more freedom regarding the configuration of the light-distribution pattern. Special design aspects may also be enjoyed by means of subdividing or segmenting the projection lens 105. It is conceivable, of course, to subdivide the lens 105 into more than two segments 105*a*, 105*b*.

Figure 4D:
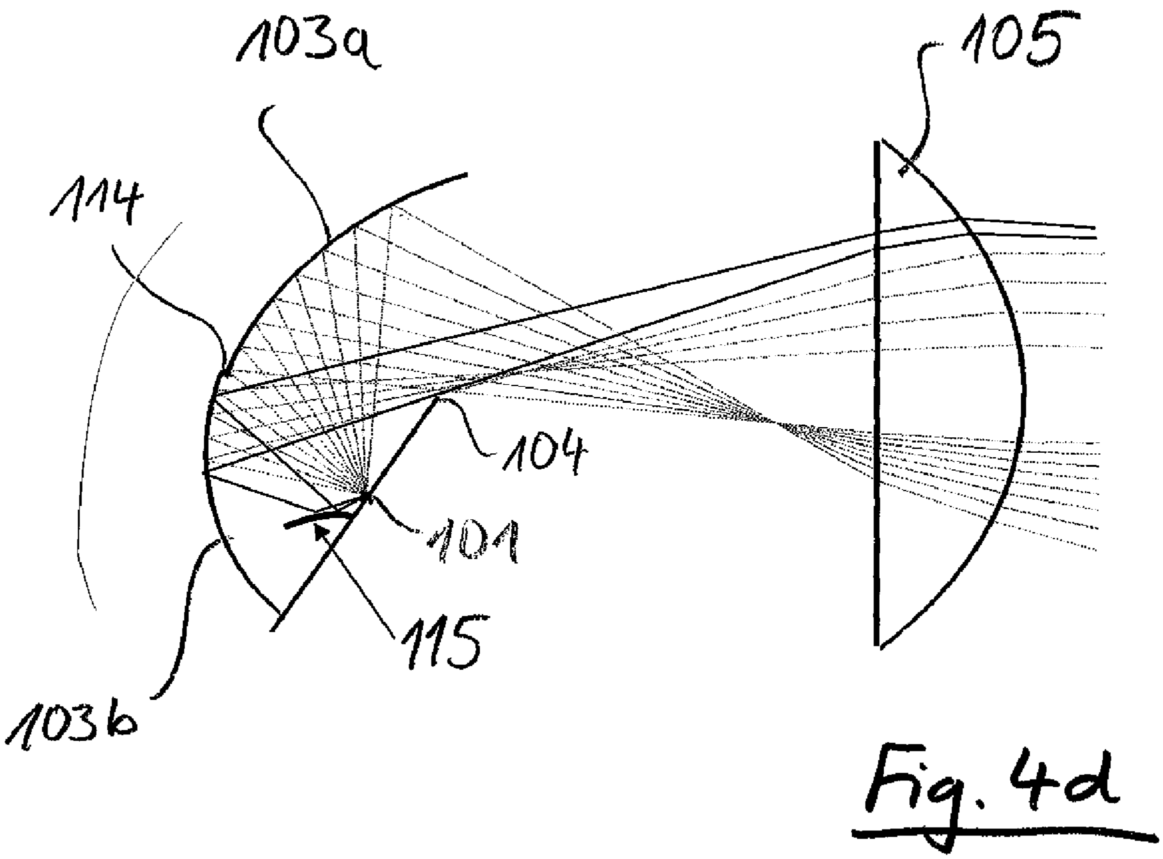

FIG. 4*d* shows another embodiment example of the projection module 100 based on the invention. In addition to the previously-described components, an additional reflector 115 may be positioned in the vicinity of, and below, the light source(s) 101 through which the light-flow efficiency of the module 100 is improved. It is the task of this reflector 115 to reflect the light that has been beamed downward into the upper and lower partial reflectors 103*a* and 103*b* instead so that it may be used a contribution to the overall light-distribution pattern. Without this additional reflector 115, the light emitted from the light source 101 below a certain angle can no longer be used since, because of the steep incident angle, it strikes the baffle arrangement 104 or goes past the lens 105 above it.

The invention claimed is:

1. Projection module for a headlamp mounted to the front of an automobile, with the module comprising;

at least one semiconductor emission source emitting electromagnetic radiation and thermally connected with a heat sink;

a reflector to reflect the emitted irradiation;

a baffle arrangement to shade at least a portion of the reflected irradiation mounted co-planar to the at least one semiconductor emission source; and a projection lens to project the reflected irradiation and a lens bracket, the irradiation path being from the emission source to the reflector then passing by the baffle arrangement and directly through the projection lens to create a desired emission distribution from the projection module in a first direction towards the front of the automobile;

characterized in that the at least one emission source is mounted on the rear side of the baffle arrangement with the main irradiation direction of the at least one emission source being directed opposing the first direction and towards a semi-open space created between the baffle arrangement and the reflector, whereby the heat sink and the lens bracket are a single unit and provides a securing frame which holds together the emission source, the reflector, the baffle arrangement, and the projection lens in a defined relationship to one another in order to provide the irradiation path.

2. Projection module as in claim 1, characterized in that the irradiation possesses a wavelength within the visible-light spectrum.

3. Projection module as in claim 1, characterized in that irradiation possesses a wavelength within the invisible infrared-light spectrum.

4. Projection module as in claim 1, characterized in that the reflector is assigned to multiple emission sources.

5. Projection module as in claim 1, characterized in that the reflector is divided into an upper partial reflector and a lower partial reflector by a substantially horizontal plane.

6. Projection module as in claim 5, characterized in that the upper partial reflector is positioned forward along the irradiation emission direction from the projection module with respect to the lower partial reflector so that the projection module creates a pre-determined light distribution pattern on a reflecting surface of the reflector calculated at discrete points providing pre-determined illumination-strength maxima and pre-determined illumination-strength minima.

7. Projection module as in claim 5, characterized in that the lower partial reflector is in a fixed spatial relationship to the at least one emission source.

8. Projection module as in claim 5, characterized in that the upper partial reflector is shaped as a paraboloid and the lower partial reflector is shaped as an ellipsoid.

9. Projection module as in claim 8, characterized in that the upper partial reflector and the lower partial reflector are positioned such that the focal point of the upper partial reflector and a first focal point of the lower partial reflector lies in the area of the at least one emission source, and a second focal point of the lower partial reflector lies in the area of the baffle plane.

* * * * *